(12) United States Patent
Lv et al.

(10) Patent No.: US 11,055,906 B2
(45) Date of Patent: Jul. 6, 2021

(54) METHOD, DEVICE AND COMPUTING DEVICE OF FACE IMAGE FUSION

(71) Applicant: Xiamen Home Meitu Technology Co. Ltd., Xiamen (CN)

(72) Inventors: Yangming Lv, Xiamen (CN); Huaye Zhang, Xiamen (CN); Yinzhen Dai, Xiamen (CN); Xingyun Liu, Xiamen (CN); Wei Zhang, Xiamen (CN)

(73) Assignee: XIAMEN HOME MEITU TECHNOLOGY CO. LTD., Xiamen (CN)

( * ) Notice: Subject to any disclaimer, the term of this patent is extended or adjusted under 35 U.S.C. 154(b) by 12 days.

(21) Appl. No.: 16/671,547

(22) Filed: Nov. 1, 2019

(65) Prior Publication Data
US 2020/0160595 A1    May 21, 2020

Related U.S. Application Data

(63) Continuation of application No. PCT/CN2017/087753, filed on Jun. 9, 2017.

(30) Foreign Application Priority Data

May 2, 2017 (CN) .......................... 201710300436.6

(51) Int. Cl.
*G06T 17/00* (2006.01)
*G06T 7/90* (2017.01)
*G06T 7/40* (2017.01)
*G06T 15/04* (2011.01)

(52) U.S. Cl.
CPC ................ *G06T 17/00* (2013.01); *G06T 7/40* (2013.01); *G06T 7/90* (2017.01); *G06T 15/04* (2013.01); *G06T 2207/10024* (2013.01); *G06T 2207/30201* (2013.01)

(58) Field of Classification Search
None
See application file for complete search history.

(56) References Cited

U.S. PATENT DOCUMENTS

| | | | |
|---|---|---|---|
| 2002/0050988 A1* | 5/2002 | Petrov | G06K 9/20 345/418 |
| 2013/0215116 A1* | 8/2013 | Siddique | G06Q 20/204 345/420 |
| 2018/0204052 A1* | 7/2018 | Li | G06K 9/6206 |

* cited by examiner

*Primary Examiner* — Steven Z Elbinger
(74) *Attorney, Agent, or Firm* — IPro, PLLC

(57) ABSTRACT

The invention discloses a method of face image fusion, and the method comprises: calculating three-dimensional models of face in the material image and the target image as a first three-dimensional model and a second three-dimensional model respectively; calculating a first projection matrix and a second projection matrix by projecting the first three-dimensional model and the second three-dimensional model projecting onto a plane respectivley; calculating a first texture coordinate according to the first three-dimensional model and the first projection matrix; calculating a second texture coordinate according to the second three-dimensional model and the second projection matrix; obtaining a re-constructed face image of the target image by replacing the first texture coordinate with the second texture coordinate; and fusing the re-constructed face image of the target image with the material image to generate the fusion image.

14 Claims, 5 Drawing Sheets

METHOD, DEVICE AND COMPUTING DEVICE OF FACE IMAGE FUSION

CROSS-REFERENCE TO RELATED APPLICATION

This application claims priority from CN Patent Application Serial No. 201710300436.6, filed on May 2, 2017, the entire contents of which are incorporated herein by reference for all purposes.

TECHNICAL FIELD

This invention is related to the technical field of image processing, especially to a method, device and computing device of face image fusion.

BACKGROUND

During daily activities of image taking, social networking and so on, a user frequently wants to replace the face in one image with the face in another image, which is commonly known as face changing. In an application of face changing, in general, a face in a target image is fused into a corresponding face of a material image.

Currently, the common method adapted in a face changing application comprises: cutting the portion of the face (or head) of a person A in a target image along the outline of the face (or head), and replacing the face of a person B in a material image with the cut portion. This face replacement method is simple and can meet requirement of some users. However, for two faces with big posture difference, it is difficult to make replacement and generally creates serious deformation of five-sense organs, so it is hard to meet user requirements. In addition, because of the differences in the illumination, viewing angle and so on during different image taking process, if the face portion is replaced directly, some unnormal phenomenon, including the tone mismatched, people being not harmonious with the background and so on, may rise due to the fact that the color of face is inconsistent with the color of background.

Therefore, a new face changing solution is proposed to effectively solve some or at least one of the above mentioned problems.

SUMMARY

To this end, this invention provides a method, device and computing device of face image fusion to solve or alleviate at least one problem mentioned above.

According to one aspect of the present invention, a method of face image fusion is provided. This method is configured to fuse a face in a target image with a face in a material image. This method comprises steps of: calculating a first three-dimensional model of a face in the material image and a second three-dimensional model of the face in the target image respectively; calculating a first projection matrix by projecting the first three-dimensional model onto a plane and a second projection matrix by projecting the second three-dimensional model onto a plane; calculating a first texture coordinate of the face based on the first three-dimensional model and the first projection matrix; calculating a second texture coordinate of the face based on the second three-dimensional model and the second projection matrix; obtaining a re-constructed face image of the target image by replacing the first texture coordinate with the second texture coordinate; and fusing the re-constructed face image of the target image with the material image to generate a fusion image.

Optionally, in the method of face image fusion of the present invention, after obtaining the re-constructed face image of the target image, the method further comprises: generating a first face mask based on features of the face in the material image and generating a second face mask based on features of the face in the target image; calculating a value of skin-color of the fused face according to the color of the mask regions in the first face mask and the second face mask; and assigning the value of the skin-color of each pixel of the fused face to the corresponding pixel of the material image, so as to obtain an adjusted material image.

Optionally, in the method of face image fusion of the present invention, the step of fusing the re-constructed face image of the target image with the material image to generate the fusion image further comprises: fusing the re-constructed face image of the target image with the adjusted material image, so as to generate the fusion image.

Optionally, in the method of face image fusion of the present invention, the step of calculating the value of the skin-color of the fused face according to the value of the color of the mask regions in the first face mask and the second face mask comprises: calculating the average value of the color of the mask regions in the first face mask and the second face mask to obtain a first skin color and a second color respectively; and conducting migration process on the value of color of the face regions in the target image based on the first skin color and the second skin color to obtain the value of the skin-color of the fused face.

Optionally, in the method of face image fusion of the present invention, the value of the skin-color of the fused face is calculated by:

$$pU_i = pu_i \times \frac{M\_mean}{U\_mean},$$

wherein, $pU_i$ is the value of the skin-color of the i-th pixel in the fused face region, $pu_i$ is the value of the skin-color of the i-th pixel of the face region in the target image, M_mean is the first skin color, and U_mean is the second skin color.

Optionally, in the method of face image fusion of the present invention, the first three-dimensional model and the second three-dimensional model are calculated based on a three-dimensional morph model. This method further comprises: building a space base of face according to pre-collected three-dimensional data of the face; and calculating the three-dimensional model of target face based on the linear combination of the base of face space.

Optionally, in the method of face image fusion of the present invention, after obtaining the first three-dimensional model and the first projection matrix, the method further comprises step for calibrating the first three-dimensional model and/or the first projection matrix, which comprises: projecting the first three-dimensional model onto the plane through the first projection matrix, and comparing the project result with the original material image; if differences of some portions exist, adjusting the first three-dimensional model; and if the overall error occurs, adjusting the first projection matrix.

Optionally, in the method of face image fusion of the present invention, the step of generating the first face mask and the second face mask further comprises: conducting edge feather process on the mask regions of the first face mask and the second face mask respectively.

According to another aspect of the present invention, a device of face image fusion is provided. This device can be adapted to fuse a face in a target image and a face in a material image, and the device comprises: a three-dimensional model calculation unit, adapted to calculate a first three-dimensional model of a face in the material image and a second three-dimensional model of the face in the target image respectively; and calculate a first projection matrix by projecting the first three-dimensional model onto a plane and a second projection matrix by projecting the second three-dimensional model onto a plane respectively; a texture coordinate calculation unit, coupled to the three-dimensional model calculation unit, and adapted to calculate a first texture coordinate based on the first three-dimensional model and the first projection matrix and calculate a second texture coordinate based on the second three-dimensional model and the second projection matrix; a three-dimensional image reconstruction unit, coupled to the texture coordinate calculation unit, and adapted to replace the first texture coordinate with the second texture coordinate so as to obtain a re-constructed face image of the target image; and an image fusion unit, coupled to the three-dimensional image reconstruction unit, and adapted to fuse the re-constructed face image of the target image with the material image to generate the fusion image.

Optionally, the device of face image fusion of the present invention further comprise: a face mask generating unit, being adapted to generate a first face mask based on features of the face of the material image and generate a second face mask based on features of the face of the target image respectively; a skin-color calculation unit being adapted to calculate a value of skin-color of the fused face according to the value of color of the mask regions in the first face mask and the second face mask. The image fusion unit is further adapted to assign the value of the skin-color of each pixel of the fused face to the corresponding pixel of the material image, so as to obtain an adjusted material image.

Optionally, in the device of face image fusion of the present invention, the image fusion unit is further adapted to fuse the re-constructed face image of the target image with the adjusted material image, so as to generate the fusion image.

Optionally, in the device of face image fusion of the present invention, the skin-color calculation unit is further adapted to: calculate the average value of the color of the mask regions in the first face mask and the second face mask to obtain a first skin color and a second skin color respectively; and conduct migration process on the value of color of the face regions in the target image based on the first skin color and second skin color, so as to obtain the skin color value of the fused face.

Optionally, in the skin-color calculation unit of the device of face image fusion of the present invention, the skin-color value of the fused face is calculated by:

$$pU_i = pu_i \times \frac{M\_mean}{U\_mean},,$$

wherein, $pU_i$ is the value of the skin-color of the i-th pixel in the fused face region, $pu_i$ is the value of the skin-color of the i-th pixel of the face region in the target image, M_mean is the first skin color, and U_mean is the second skin color.

Optionally, in the device of face image fusion of the present invention, the three-dimensional model calculation unit is further configured to: build a space base of face according to pre-collected three-dimensional data of the face; and calculate the three-dimensional model of target face based on the linear combination of the space base of the face.

Optionally, in the device of face image fusion of the present invention, the three-dimensional model calculation unit comprises a calibration unit, and the calibration unit is adapted to project the first three-dimensional model onto a plane through the first projection matrix, and compare the project result with the original material image: if differences of some portions exist, adjust the first three-dimensional model; and if the overall error occurs, adjust the first projection matrix.

Optionally, in the device of face image fusion of the present invention, the mask generation unit is further adapted to conduct edge feather processing on the mask regions of the first face mask and the second face mask respectively.

According to another aspect of the present invention, a computing device is provided. The computing device comprising: at least one processor; and a memory storing program instruction thereon, wherein, the processor being configured to execute the program instruction so as to perform the method of face image fusion as described above.

According to another aspect of the present invention, the computer readable storage medium with program instruction stored thereon is provided, and the program instruction including the device of face image fusion as described above; when the device of face image fusion stored in the computer readable storage medium are loaded, the computing device can perform the method of face image fusion as described above.

The invention transforms a two-dimensional image into three-dimensional space and obtains texture coordinates of the face part based on a three-dimensional face reconstruction technology, so as to replace the face in the material image with the face in the target image, and efficiently solve the face deformation problem caused by differences of the face posture. For example, in the case of replacing a front face into a side face, and replacing one side face into another side face, it can significantly ameliorate the problem of the posture differences.

BRIEF DESCRIPTION OF THE DRAWINGS

In order to accomplish the foregoing and related objects, certain illustrative aspects will be described hereby in connection with the following description and drawings, and these aspects indicate the various ways in which the principles disclosed herein can be practiced, in addition, all the aspects and equivalents thereof are intended to be within the scope of the claimed subject matter. Through reading the following detailed description in conjunction with the drawings, the foregoing and other objects, features, and advantages of the disclosure will become more apparent. The same parts and elements are generally denoted with the same reference numbers throughout the disclosure.

DETAILED DESCRIPTION

Figure 1:
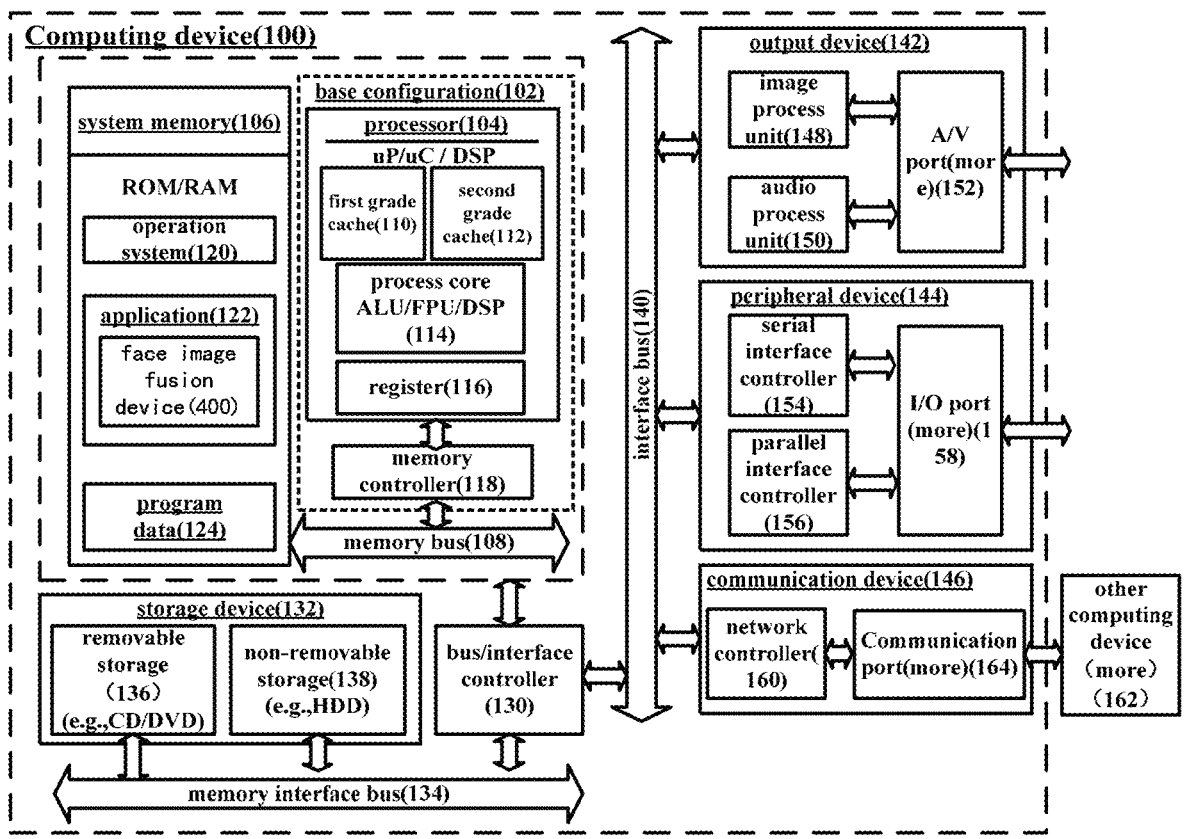
FIG. 1 shows a construction block diagram of a computing device 100 in accordance with an embodiment of the invention.

The exemplary embodiments of the disclosure will now be described in more details in conjunction with the drawings. Although the exemplary embodiments of the disclosure are shown in the drawings, what should be understood is that the disclosure can be implemented in various ways without being restricted to the embodiments set forth herein. On the contrary, these embodiments are provided for understanding the disclosure more thoroughly, and for being able to convey the full scope of the disclosure to those skilled in the art FIG. 1 is a block diagram of an example computing device 100. In the base configuration 102, the computing device 100 typically comprises a system memory 106 and one or more than one processor 104. A memory bus 108 can be used to communicate between the processor 104 and the system memory 106.

Depending on the expectation configuration, the processor 104 could be any kind of processor, which comprises but not limited to: the micro-processor (µP), micro-controller (µC), digital information processor (DSP), or any combination of them. The processor 104 can comprise one or more grade cache like the first grade cache 110 and the second grade cache 112, process core 114 and register 116. The example process core 114 can comprise the arithmetic logical unit (ALU), the floating point unit (FPU), digital signal process core (DSP core) or any combination of them. An example memory controller 118 can be used with the processor 104, or in some reality, the memory controller 118 can be an inside part of the processor 104.

Depending on the expectation configuration, the system memory 106 could be any kind of memories, which comprises but not limited to: volatile memory (such as RAM), nonvolatile memory (such as ROM, flash memory and so on) or any combination of them. The system memory 106 could comprise an operation system 120, one or more application 122 and the program data 124. In some modes of execution, the application 122 could be configured to use the program data 124 to operation in operation system.

The computing device 100 also comprises the interface bus 140 which is conducive to communication from all kinds of interface devices (for example, output device 142, peripheral interface 144 and communication device 146) to the base configuration 102 through bus/interface controller 130. The example output device 142 comprises an image process unit 148 and an audio process unit 150. They could be configured to be conducive to communication with all kinds of the external devices for example monitors or speakers through one or more A/V port 152. The example peripheral interface 144 could comprise a serial interface controller 154 and a parallel interface controller 156, which could be configured to be conducive to communication with external devices such as input devices (for example, keyboard, mouse, pen, voice-input device, touch input device) or other peripherals (for example printer, scanner and so on) through one or more I/O port 158. The example communication device 146 could comprise network controller 160 that could be configured to be conducive to communication with one or more other computing device 162 through one or more communication port 164, which is communicated by the network communicating link.

The network communicating link could be one example of the communication medium. The communication medium could be reflected as the computer readable instruction, data construction, program module inside the modulation data signal such as carrier or other transmission mechanism, and the communication medium could comprise any information delivery medium. "The modulation data signal" could be this kind of signal, and one or more or its modification of the date-set could be conducted as encoding information in signal. As the unlimited example, the communication medium could comprise such as the wire medium like the wire network or the private wire network, and all kinds of wireless medium like voice, Radio Frequency (RF), microwave, Infrared Radiation (IR) or other wireless medium. The described term "computer readable medium" could comprise the memory medium and communication medium.

The computing device 100 could be one part of the small size and portable (mobile) electronic devices, which could be cell phone, Personal Digital Assistant (PDA), personal media player device, wireless network browsing device, personal headwear device, application special device, or the combination device comprising any above function. The computing device 100 also could be implemented as the personal computer like desktop and laptop. In some embodiments, the computing device 100 is configured to execute the face image fusion method 200, and the application 122 comprises the face image fusion device 400 of the invention.

Figure 2:
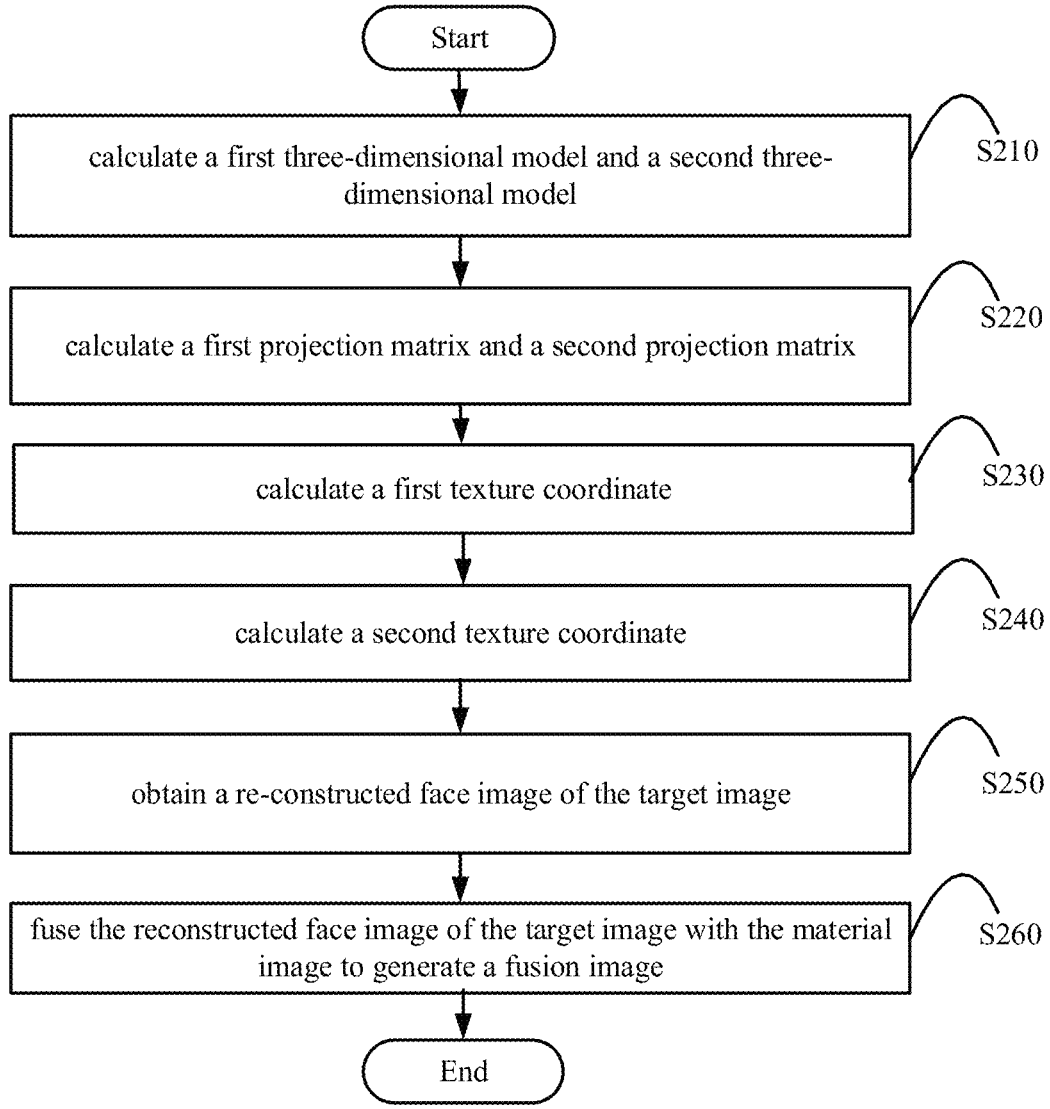
FIG. 2 shows a flow chart of a method 200 of face image fusion in accordance with an embodiment of the invention.

FIG. 2 shows a flowchart of a method 200 of face image fusion in accordance with an embodiment of the invention. As shown in FIG. 2, the method 200 begins at step S210. In step S210, a three-dimensional model of a face in a material image is calculated as a first three-dimensional model (M_3), meanwhile, a three-dimensional model of a face in a target image is calculated as a second three-dimensional model (U_3). According to one implementation mode, a material image library can be established, and a first three-dimensional model library is constructed by calculating three-dimensional models of face of the material images in the material image library.

According to one embodiment of the invention, the first three-dimensional model and the second three-dimensional model are obtained through a three-dimensional morphable model (3DMM). The 3DMM model is mentioned in the paper "A Morphable Model For The Synthesis Of 3D Faces" published by Blanz and Vetter in 1999. The basic idea of the method is, by taking a face space as a linear space, the face in the two-dimensional image is approximated by the projection of linear combination of pre-established three-dimensional faces. The method of calculating the three-dimensional model of face by using 3DMM model can be divided into two steps: firstly, a space base of face is built by utilizing face database according to pre-collected three-dimensional data of faces; then, for the given specific face, by computing coefficients of the face related to a set of face mode in the space base, a specific three-dimensional model of the face can be calculated, in detail, the three-dimensional model can be calculated bases on the linear combination of the space base of the face.

Then, in step S220, a first projection matrix (mvp_M) of the first three-dimensional model M_3 projecting onto a plane is calculated, and a second projection matrix (mvp_U) of the second three-dimensional model U_3 projecting onto a plane is also calculated. Optionally, the projection matrixes comprise parameters of rotation, scaling and translation.

Considering that generally material images are relatively fixed, so the first three-dimensional model and/or the first projection matrix of the material image can also be calibrated after the first three-dimensional model and the first projection matrix of the material image being calculated. According to the embodiment of this invention, the first three-dimensional model is projected onto a plane through the first projection matrix, and the project result is compared with the original material image: ① if the image in whole is correct, but some portions thereof have error, for example, if the size of the eyes according to the projection of the three-dimensional model is different from the size of the eyes of the original material image, then eliminate the error by adjusting the first three-dimensional model, such as adjusting the first three-dimensional model by using a grid morphable mode; ② if the image in whole has error, such as if there is deviation between the eyes obtained after the three-dimensional model projection and the eyes on the original material image, then adjust the first projection matrix to eliminate the error.

Then, in step S230, a first texture coordinate of the face in the material image is calculated based on the first three-dimensional model and the first projection matrix. According to an implementation mode of this invention, the texture coordinate of the face in the material image is calculated by using mvp_M*M_3, and is referred as the first texture coordinate TC_M.

Meanwhile, in step S240, by using the same method, the texture coordinate of the face in the target image is calculated based on the second three-dimensional model U_3 and the second projection matrix mvp_U, and is referred as the second texture coordinate TC_U.

Then, in step S250, the first texture coordinate TC_M is replaced by the second texture coordinate TC_U, and a re-constructed face image of the target image is obtained by re-calculating based on the replaced texture coordinate. Because the number of the vertices and the topological information in the first three-dimensional model and the second three-dimensional model are completely consistent, and the differences between these two three-dimensional models only lie in the vertex coordinates and the projection matrix projected onto the two-dimensional image, so the re-constructed face image of the target image can be obtained by replacing the texture of each triangular block on TC_U with a corresponding triangular block on TC_M. Generally, the size and shape of triangular blocks on these two texture coordinates may be different, and these two triangular blocks can be transformed into congruent triangular blocks through affine transformation.

In this solution, the three-dimensional face re-constructed technology is used to transform the two-dimensional image into three-dimensional space and obtain the texture coordinates of the face portion, in order to replace the face in the material image with the face in the target image, and efficiently solve the face-change deformation problem caused by the differences of the face posture. For example, in cases of replacing a front face into a side face, and replacing one side face into another side face, it can significantly ameliorate the problem caused by the posture differences. Optionally, when the side faces' angles are opposite, it can conduct mirror processing on the target images at first.

Further, in the case of replacing side face to front face, when the problem of texture absence emerges, for example half of the side face may be blocked by nose, by using the deep learning technology to conduct learning on the corresponding existed features of the face, the lost information of the face can be obtained. In the above example, a deep learning model can be built to conduct train on features of another half face (also comprise general features of the face), so that features blocked by the nose can be obtained.

Then, in step S260, the re-constructed face image of the target image is fused with the material image to generate a fusion image, that is, projecting the re-constructed face image of the target image onto a two-dimensional plane, and then replacing the corresponding face in the material image with the project result to generate the fusion image.

According to another embodiment of the invention, besides obtaining the face texture information based on the three-dimensional model of the face to make replacement, the skin of face is also fused based on the color information of the skin of face.

Therefore, after step S250, before fusing the re-constructed face image of the target image with the material image, a first face mask and a second face mask (not show in the figures) are generated according to features of the face in the material image and the target image respectively, which means, "frame" the face part of the image by the mask. Wherein, these features of the face are already obtained in step S210 when calculating the three-dimensional model of the face, and the technology of extracting features of the face is well known in this field and is not described in detail herein.

According to an embodiment of the invention, during the process of generating the face mask basing on features of the face, in order to calculate the skin-value of skin region of the face more accurately, the protection or skin identification of five sense organs could be conducted, in order to reduce the influence of the hair, eyebrow, eyes on the skin value. In addition, edge feather process is conducted on mask regions of the first face mask and the second face mask respectly, in order to eliminate the edge inharmony, and have better fusion effects later.

Figure 3:
FIG. 3 shows a diagram with an original image compared with an image comprising a face mask in accordance with an embodiment of the invention.

FIG. 3 shows a comparison between an original image and an image with face mask in accordance with an embodiment of the invention. The mask region in the image with face mask is correspondent to the face region in the original image, and comprises base outlines of eyes, month, nose, eyebrows and face.

Then, based on the color value of the mask region in the first face mask and the mask region in the second face mask, the values of skin-color of the fusion face is calculated. Specifically, the average value of color, for example, the average values of RGB, of the mask region in the first face mask and the second face mask are calculated respectively, and are referred as a first skin color and a second skin color. Then a migration operation is conducted on the values of color of face regions in the target image according to the first skin color and the second skin color, in order to obtain the value of the skin-color of the fused face ($pU_i$):

$$pU_i = pu_i \times \frac{M\_mean}{U\_mean}$$

wherein, $pU_i$ is the value of skin-color of the i-th pixel in the fused face region, $pU_i$ is the value of skin-color of the i-th pixel of the face region in the target image, M_mean is the first skin color, and U_mean is the second skin color.

Finally, the value of skin-color $pU_i$ of the fused face is assigned to the corresponding pixel in the material image so that the adjusted material image is obtained.

In this way, in step 260, the re-constructed face image of the target image is fused with the adjusted material image to generate the fusion image.

In this solution, the face parts replacement between the material image and the target image is achieved based on the three-dimensional face re-construction technology, which efficiently solves the morph problem occurred due to the difference of the face posture between the two fusion image. And, by taking the differences of skin of the face in the target image and the material image into consideration, skin immigration is conducted to make the fusion image more nature.

Figure 4:
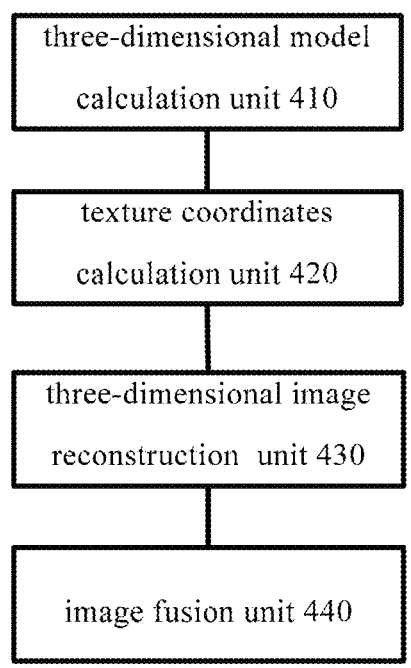
FIG. 4 shows a schematic diagram of a face image fusion device 400 in accordance with an embodiment of the invention.

FIG. 4 shows face image fusion device 400 according to the embodiment of the invention.

As show in FIG. 4, the fusion device 400 comprises a three-dimensional model calculation unit 410, a texture coordinate calculation unit 420, a three-dimensional image reconstruction unit 430 and an image fusion unit 440. The three-dimensional model calculation unit 410 is coupled to the texture coordinate calculation unit 420, the three-dimensional image reconstruction unit 430 is coupled to the texture coordinate calculation unit 420, and the image fusion unit 440 is coupled to the three-dimensional image reconstruction unit 430.

The three-dimensional model calculation unit 410 calculates three-dimensional models of faces in a material image and a target image, as a first three-dimensional model M_3 and a second three-dimensional U_3 respectively.

Optionally, the fusion device 400 may comprises an image acquisition unit (not shown) to acquire the material image and the target image, in order to transmit the acquired image to the coupled three-dimensional model calculation unit 410 to conduct the fusion possession described herein.

According to an embodiment of the invention, the first three-dimensional model and the second three-dimensional model are calculated based on a three-dimensional morphable model (3DMM). The 3DMM model is disclosed in the paper "A Morphable Model For The Synthesis Of 3D Faces" published by Blanz and Vetter in 1999. According to the 3DMM model, the three-dimensional model calculation unit 410 is configured to build space base of face according to pre-collected three-dimensional face data, then fit the three-dimensional model of the target face based on the linear combination of the built space base of the face.

In addition, the three-dimensional model calculation unit 410 also calculates a first projection matrix mvp_M by projecting the first three-dimensional model M_3 onto a plane and a second projection matrix mvp_U by projecting the second three-dimensional model U_3 onto a plane respectively. Optionally, the projection matrixes may comprise the parameters of rotation, scaling, and translation.

Consider that generally material images are relatively fixed, so after the three-dimensional model calculation unit 410 calculates the first three-dimensional model and the first projection matrix of the material image, the three-dimensional model calculation unit 410 also conducts calibration on the first three-dimensional model and/or the first projection matrix of the material image. According to an embodiment of the invention, the three-dimensional model calculation unit 410 comprises a calibration unit (not shown), which projects the first three-dimensional model onto plane through the first projection matrix, and compares project result with the original material image: ① if the whole image is correct, but the difference existed in some part of the figure, for example, the size of the eyes in the project result is different from the size of the eyes in the original material image, then adjust the first three-dimensional model, for example, based on a grid morphable mode to eliminate the difference; ② if the overall error is occurred, such as there is deviation between the eyes in image obtained after the projection and the eyes in the original material image, then adjust the first projection matrix to eliminate the error.

The texture coordinates calculate unit 420 calculates a texture coordinate of the face in the material image based on the first three-dimensional model and the first projection matrix. Unit 420 also calculates a texture coordinate of the face in the target image based on the second three-dimensional model and the second projection matrix. According to an embodiment of the invention, the texture coordinate of the face in the matetrial image, referred as the first texture coordinate TC_M, is calculated by mvp_M*M_3; and the texture coordinate of the face in the target image, referred as the second texture coordinate TC_U, is calculated by mvp_U*U_3.

The three-dimensional image reconstruction unit 430 replaces the first texture coordinate with the second texture coordinate to obtain the re-constructed face image of the target image.

Due to the fact that the number of the vertices and the topological information in the first three-dimensional model and the second three-dimensional model are completely consistent, and the difference between the two three-dimensional models only lies in the vertex coordinates and the projection matrix projected onto the two-dimensional image, the texture coordinates can be treated as triangle blocks, and the texture of each triangular block in TC_M is replaced by a corresponding triangular block in TC_U. Specially, the size and shape of triangle blocks in the first texture coordinate and the second texture coordinate may be different, and these two triangular blocks can be transformed into congruent triangular blocks through affine transformation. After all blocks are correspondingly replaced, the re-constructed face image of the target image can be obtained.

The image fusion unit 440 fuses the re-constructed face image of the target image with the material image, to generate a fusion image. In detail, the unit 440 project the re-constructed face image of the target image onto a two-dimensional plane, and then correspondingly replace it into the corresponding face in the material image.

Figure 5:
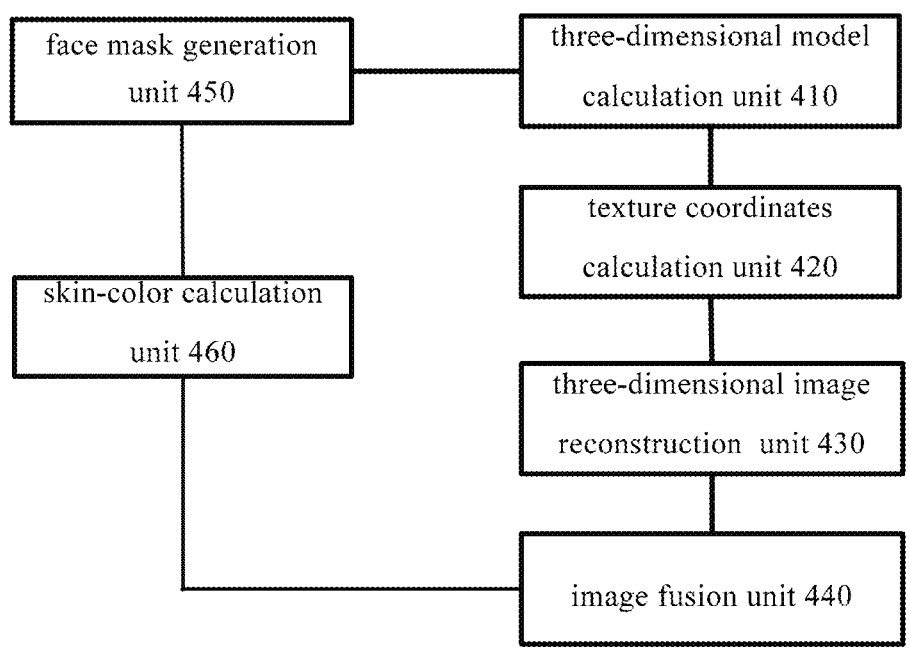
FIG. 5 shows a schematic diagram of a face image fusion device 400 in accordance with another embodiment of the invention.

According to another embodiment of the invention, besides generating a fusion image by replacing the face texture information generated based on the face three-dimensional model, the fusion image is generated further by fusing the face skin based on the color information thereof So, the fusion device 400 also comprises a face mask generation unit 450 and a skin-color calculation unit 460, as showed in FIG. 5.

The face mask generation unit 450 acquires features of the face in the material image and the target image from the three-dimensional model calculation unit 410, and generates a first face mask based on the features of face in the material image and a second face mask based the features of face in the target image respectively. According to an embodiment of the invention, in the process of generating the face mask basing on facial features, in order to calculate the skin-value of the face skin region more accurately, the face mask generation unit 450 can conduct the process of the five sense organs protection or skin identification, in order to reduce the influence on the skin value by the hair, eyebrow, eyes and so on. In addition, the face mask generation unit 450 can conduct edge feather processing on mask regions of the first face mask and the second face mask, in order to eliminate the edge inharmony, and make the following fusion process more effectivelyr. The process of face mask has been explained clearly in above mentioned description in connection with the FIG. 3, so there is no more detailed description herein.

The skin-color calculation unit 460 calculates the value of skin-color of the fusion face based on the color value of the mask regions in the first face mask and the second face mask. In an embodiment, the skin-color calculation unit 460 calculates the average values of color of the mask region in the first face mask and the second face mask as a first skin color and a second skin color respectively. Optionally, the average value of RGB of pixels in the mask region is calculated as the first and second skin color. The skin-color calculation unit further make migration calculation on the color value of the face region in the target image based on the first skin color and second skin color to obtain the skin-color value of the fused face, which can be referred as:

$$pU_i = pu_i \times \frac{M\_mean}{U\_mean}$$

Wherein, $pU_i$ is the value of skin-color of the i-th pixel in the fused face region, $pu_i$ is the value of skin-color of the i-th pixel of the face region in the target image, M_mean is the first skin color, and U_mean is the second skin color.

The image fusion unit 440 assigns the value of skin-color of the fused face acquired from the skin color calculation unit 460 to the corresponding pixel of the material image to obtain the adjusted material image.

The image fusion unit 440 then fuses the re-constructed face image of the target image acquired from the three-dimensional image reconstruction unit 430 with the adjusted material image to generate the fusion image.

The various techniques described herein may be implemented in combination with hardware or software or their combination. Thus, the method and device of the invention, or some aspects or portions of the method and device of the invention may take the form of an embedded tangible media, such as a floppy disk, a CD-ROM, a hard disk drive, or any other forms of program code (i.e. instructions) in machine-readable storage media, wherein, when the program is loaded into a machine such as a computer, and executed by the machine, the machine becomes the device for practicing the invention.

When the program code is executed on a programmable computer, the computing device generally comprises a processor, storage medium readable by the processor (comprising volatile memory and non-volatile memory and/or memory elements), at least one input device and at least one output device. Wherein, the memory is configured to store program codes; the processor is configured to execute the image fusion method of the invention, according to the instructions which are stored in the described program code contained in the memory.

According to the way of example but not limitation, computer readable medium comprises computer memory medium and communication medium. Computer memory medium stores information such as computer readable instructions, data structures, program modules, or other data. The communication medium generally reflects computer readable instructions, data structures, program modules, or other data through the modulation data signal such as carrier or other transport mechanism, and comprises any information delivery medium. The combinations of any above are also comprised in the scope of computer readable medium.

It is to be understood that in order to make the disclosure concise and one or more of the inventive aspects understood, individual features of the present invention are sometimes grouped together into a single embodiment, drawing or description thereof in the above description of the exemplary embodiments of the present invention. However, the disclosed method should not be construed to reflect an intention that the claimed present invention claims more features than those explicitly stated in each claim. More specifically, as reflected in the claims below, the inventive aspect contains less than all features of an individual embodiment disclosed above. Thus, the claims abiding by the detailed description are hereby explicitly incorporated into the specific embodiments, wherein each claim per se serves as a single embodiment of the present invention.

Those skilled in the art should understand that the modules or units or components of the devices in the examples disclosed herein can be arranged in a device as described in the embodiment, or can alternatively be positioned in one or more devices different than the exemplary device. The modules in the aforementioned examples can be combined into one module or beyond this divided into a plurality of sub-modules.

Those skilled in the art can understand that the modules in the devices of the embodiments can be modified adaptively and arranged in one or more devices different than the embodiment. The modules or units or components in the embodiments can be combined into one module or unit or component, and they can be further divided into a plurality of sub-modules or sub-units or sub-components. Any combination of the features and/or process or units can be used to combine all features disclosed in this specification (including the accompanying claims, abstract and drawings) and any method or all processes or units of the devices as such disclosed, except that at least some of such features and/or processes and/or units are repulsive to each other. Unless specified otherwise, each feature disclosed in the present specification (including the accompanying claims, abstract and drawings) can be substituted by a substitutive feature that provides an identical, equivalent or similar goal.

The invention also discloses:

A5, the method according to A4, wherein, the value of skin-color of the fused face is:

$$pU_i = pu_i \times \frac{M\_mean}{U\_mean},,$$

wherein, $pU_i$ is the value of skin-color of the i-th pixel in the fused face region, $pu_i$ is the value of skin-color of the i-th pixel of the face region in the target image, M_mean is the first skin color, and U_mean is the second skin color.

A6, the method according to any of A1-5, wherein, the first three-dimensional model and the second three-dimensional model being obtained through the three-dimensional morph model, and the method comprises: building space base of face according to pre-collected three-dimensional face data; and fitting the three-dimensional model of target face based on the linear combination of the built space base of the face.

A7, the method according to any of A1-6, wherein, after obtaining the first three-dimensional model and the first projection matrix, also comprises steps for calibrating the first three-dimensional model and/or the first projection matrix: projecting the first three-dimensional model onto plane by the first projection matrix, and comparing the project result with the original material image; if partial differences exist, adjusting the first three-dimensional model; and if the overall error occurs, adjusting the first projection matrix.

A8, the method according to any of A2-7, wherein, the step of generating a first face mask and a second face mask according to facial feature of the material image and the target image respectively, also comprising: conducting edge feather processing on mask regions of the first face mask and the second face mask.

B13, the device according to B12, in the skin-color calculation unit, the value of skin-color of the fused face is:

$$pU_i = pu_i \times \frac{M\_mean}{U\_mean},$$

wherein, $pU_i$ is the value of skin-color of the i-th pixel in the fused face region, $pu_i$ is the value of skin-color of the i-th pixel of the face region in the target image, M_mean is the first skin color, and U_mean is the second skin color.

B14, the device according to any of B9-13, wherein, the three-dimensional model calculation unit is further configured to: build space base of face according to pre-collected three-dimensional face data; and obtain the three-dimensional model of target face based the fitness of the linear combination of the face space base.

B15, the device according to any of B9-14, wherein, three-dimensional model calculation unit also comprises a calibration unit, and the calibration unit is configured to project the first three-dimensional model onto plane through the first projection matrix, and compare the project result with the original material image: if partial differences exist, adjust the first three-dimensional model; and if the overall error occurs, adjust the first projection matrix.

B16, the device according to any of B10-15, wherein, the mask generation unit is further configured to conduct edge feather processing on mask regions of the first face mask and the second face mask.

In addition, those skilled in the art can understand that although some embodiments mentioned herein comprise certain features comprised in other embodiments instead of other features, the combination of features from different embodiments implies that they fall within the scope of the present invention and form different embodiments. For example, in the following claims, any one of the claimed embodiments can be used in arbitrary combinations.

In addition, some of the embodiments herein are described as a combination of the methods or method elements implemented by a processor of a computer system or by other devices executing said functions. Therefore, a processor having instructions necessary for implementing the methods or method elements forms a device for implementing the methods or method elements. Moreover, the elements of the device embodiments mentioned herein are examples of devices that are used to implement the functions executed by the elements for implementing the goal of the invention.

As is used herein, unless specified otherwise, the description of an ordinary object with ordinal numbers "first", "second", "third" and the like only represents that different instances of similar objects are involved, and is not intended to imply that the objects as such described must have any given orders temporally, spatially, sequentially or in any other manner.

Although the present invention is described in dependence on a limited number of embodiments, owing to the above description, one skilled in the art is aware that other embodiments can be envisaged within the scope of the present invention described herein. In addition, it should be noted that the language used in the present specification is selected for the purpose of readability and teaching, rather than for explaining or defining the subject matter of the invention. Therefore, if not deviating from the scope and spirit of the attached claims, many modifications and changes are clear for those of ordinary skills in the art. For the scope of the present invention, the disclosure of the invention is illustrative, not restrictive, and the scope of the invention is defined by the appended claims.

The invention claimed is:

1. A method of face image fusion, used to fuse a face in a target image with a face in a material image, comprises:
    calculating a first three-dimensional model of face in the material image and a second three-dimensional model of face in the target image respectively;
    calculating a first projection matrix by projecting the first three-dimensional model onto a plane and a second projection matrix by projecting the second three-dimensional model projecting onto a plane respectively;
    calculating a first texture coordinate based on the first three-dimensional model and the first projection matrix;
    calculating a second texture coordinate based on the second three-dimensional model and the second projection matrix;
    obtaining a re-constructed face image of the target image by replacing the first texture coordinate with the second texture coordinate; and
    fusing the re-constructed face image of the target image with the material image to generate a fusion image,
    wherein after calculating the first three-dimensional model and the first projection matrix, the method further comprises step for calibrating the first three-dimensional model and/or the first projection matrix:
    creating a first projection by projecting the first three-dimensional model onto a plane by the first projection matrix, and
    comparing a result of the first projection result with the original material image; if the result in whole is correct, but some portions thereof have error, adjusting the first three-dimensional model; and if the result in whole is deviated, adjusting the first projection matrix.

2. The method according to claim 1, wherein, after the step of obtaining the re-constructed face image of the target image, further comprises:
    generating a first face mask based on features of the face in the material image and a second face mask based on features of the face in the target image;
    calculating values of skin-color of the fused face according to values of color of the mask regions in the first face mask and the second face mask; and
    assigning the value of skin-color of each pixel of the fused face to the corresponding pixel of the material image to obtain an adjusted material image.

3. The method according to claim 2, wherein, the step of fusing the re-constructed face image of the target image with the material image to generate the fusion image further comprises:
    fusing the re-constructed face image of the target image with the adjusted material image to generate the fusion image.

4. The method according to claim 2, wherein, the step of calculating the values of skin-color of the fused face according to the color values of the mask regions in the first face mask and the second face mask comprises:
  calculating an average value of the color of the mask regions in the first face mask and the second face mask to obtain a first skin color and a second skin color respectively; and
  conducting migration operation on the color values of face regions in the target image according to the first skin color and the second skin color to obtain the values of the skin-color of the fused face.

5. The method according to claim 4, wherein, the value of skin-color of the fused face is:

$$pU_i = pu_i \times \frac{M\_mean}{U\_mean},$$

wherein, $pU_i$ is the value of skin-color of the i-th pixel in the fused face region, $pu_i$ is the value of skin-color of the i-th pixel of the face region in the target image, M_mean is the first skin color, and U_mean is the second skin color.

6. The method according to claim 2, wherein the step of generating the first face mask and the second face mask further comprises:
  conducting edge feather processing on mask regions of the first face mask and the second face mask.

7. The method according to claim 1, wherein the first three-dimensional model and the second three-dimensional model being obtained through a three-dimensional morph model, and the method comprises:
  building space base of face according to pre-collected three-dimensional face data; and calculating the three-dimensional model of target face based on a linear combination of the built space base of the face.

8. A device of face image fusion, which is adapted to fuse a face in a target image and a face in a material image, comprises:
  a three-dimensional model calculation unit, adapted to calculate a first three-dimensional model of the face in the material image and a second three-dimensional model of the face in the target image respectively; and calculate a first projection matrix by projecting the first three-dimensional model onto a plane and a second projection matrix by projecting the second three-dimensional model onto a plane respectively;
  a texture coordinate calculation unit, coupled to the three-dimensional model calculation unit, and adapted to calculate a first texture coordinate based on the first three-dimensional model and the first projection matrix and calculate a second texture coordinate based on the second three-dimensional model and the second projection matrix;
  a three-dimensional image reconstruction unit, coupled to the texture coordinate calculation unit, and adapted to replace the first texture coordinate with the second texture coordinate to obtain a re-constructed face image of the target image; and
  an image fusion unit, coupled to the three-dimensional image reconstruction unit, and adapted to fuse the re-constructed face image of the target image with the material image to generate a fusion image, wherein, the three-dimensional model calculation unit comprises a calibration unit, and the calibration unit is configured to create a first projection by projecting the first three-dimensional model onto plane through the first projection matrix, and compare a result of the first projection with the original material image: if the result in whole is correct, but some portions thereof have error, adjust the first three-dimensional model; and if the result in whole is deviated, adjust the first projection matrix.

9. The device according to claim 8, further comprises:
  a face mask generating unit, adapted to generate a first face mask based on features of the face of the material image and generate a second face mask based on features of the face of the target image respectively; and
  a skin-color calculation unit, adapted to calculate a value of skin-color of the fused face according to the value of color of the mask regions in the first face mask and the second face mask;
  wherein the image fusion unit being further adapted to assign the value of the skin-color of each pixel of the fused face to the corresponding pixel of the material image, so as to obtain an adjusted material image.

10. The device according to claim 9, wherein,
  the image fusion unit being further adapted to fuse the re-constructed face image of the target image with the adjusted material image to generate the fusion image.

11. The device according to claim 10, wherein the skin color calculation unit is adapted to:
  calculate an average value of the color of the mask regions in the first face mask and the second face mask to obtain a first skin color and a second skin color respectively; and
  conduct migration operation on the value of color of the face regions in the target image based on the first skin color and second skin color, so as to obtain the skin color value of the fused face.

12. the device according to claim 11, wherein in the skin-color calculation unit, the value of skin-color of the fused face is:

$$pU_i = pu_i \times \frac{M\_mean}{U\_mean},$$

wherein, $pU_i$ is the value of skin-color of the i-th pixel in the fused face region, $pu_i$ is the value of skin-color of the i-th pixel of the face region in the target image, M_mean is the first skin color, and U_mean is the skin color.

13. The device according to claim 8, wherein, the three-dimensional model calculation unit is further configured to:
  build space base of face according to pre-collected three-dimensional face data; and fit the three-dimensional model of target face based on a linear combination of the face space base.

14. A computing device, comprising:
  at least one processor; and
  a memory storing program instructions thereon, and the program instructions being executed by the processor to execute the method of face image fusion of claim 1.

* * * * *